April 21, 1953 B. H. SINCLAIR 2,636,162

DECODING CIRCUIT

Filed March 4, 1952

INVENTOR.
BERT H. SINCLAIR
BY
Harry M. Saragovitz
Attorney

Patented Apr. 21, 1953 2,636,162

UNITED STATES PATENT OFFICE 2,636,162

DECODING CIRCUIT

Bert H. Sinclair, Little Silver, N. J., assignor to the United States of America as represented by the Secretary of the Army Application March 4, 1952, Serial No. 274,818

6 Claims. (Cl. 340—167)

Figure 1:
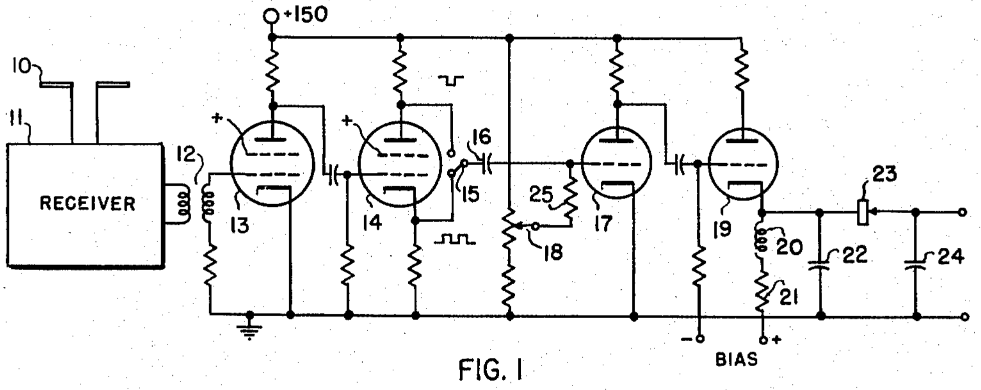

(Granted under Title 35, U. S. Code (1952), sec. 266)

The invention described herein may be manufactured and used by or for the Government for governmental purposes, without the payment of any royalty thereon.

This invention relates to a decoder for use with pulsed wave signals. In particular it relates to a decoder adapted to receive paired pulse signals and adjustable to produce an output signal only in response to signals having a particular time spacing between the pulses of a pair. It further relates to a flexible decoder for receiving pulse signals and which may be set to respond to paired pulse signals only, or to single pulse signals.

A number of circuits have been devised for responding to paired pulse signals and to multiple pulse signal groups having particular pulse spacings, so that only particular coded groups of pulses will produce an output signal from the decoder. These circuits, in general, are expensive to build and precise in operation and systems employing such arrangements are frequently found to be of limited use because of the precision requirements. These prior art arrangements generally employ relatively expensive delay lines which predetermine the decoding operations. The tolerance imposed by the use of such delay lines is very narrow and for some purposes these over-precise arrangements defeat their own purpose.

For certain electronic applications it is desirable to provide an arrangement which responds to a coded signal of spaced pulses, but which is fairly tolerant of the time spacing of the pulses and one which may readily be adjusted to accept coded pulses with different time spacings. For such type of service the precision circuits of the prior art have no value.

Accordingly, it is an object of the present invention to provide a decoder circuit for use with paired pulse signals which is adjustable to respond to pulses of a pair having substantially a particular time spacing and which may be readjusted readily to accept paired pulse signals with a different time spacing. It is a further object of the present invention to provide a decoder for receiving pulse signals which may be set to operate in one mode to respond to paired pulse signals, but which may readily be changed to accept and operate with single pulse signals.

In accordance with the present invention there is provided a decoder for paired pulse signals which is adjustable to respond to pulses of a pair having substantially a particular time spacing. The decoder is comprised of a condenser and resistance time constant circuit and a source of operating voltage. Means are provided for utilizing the source to provide limits of charge and discharge for the condenser and means to adjust at least one of the limits. Also provided are means responsive to a first received pulse signal for rapidly charging the condenser to one limit and means comprising a resistor for exponentially discharging the condenser to the other limit to provide a condition of operation such that the occurrence of a second received pulse signal during a limited time interval following the charging rapidly completes the discharging and means responsive to the rapid discharging for producing an output signal.

For a better understanding of the invention, together with other and further objects thereof, reference is had to the following description taken in connection with the accompanying drawings and its scope will be pointed out in the appended claims.

Figure 2:
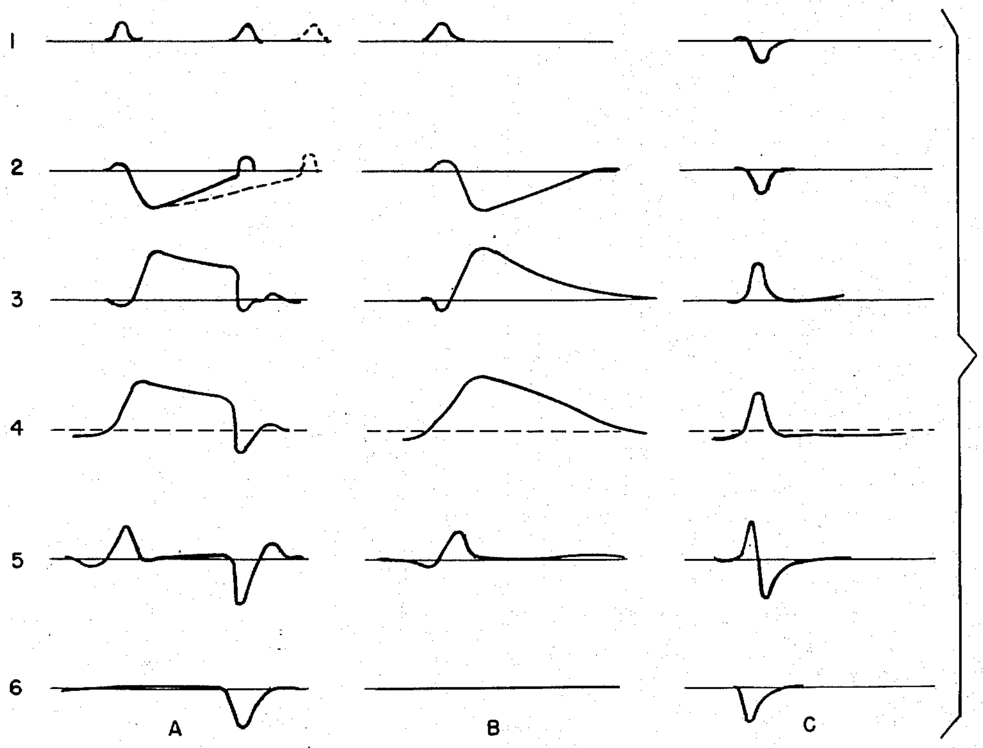

In the drawing, Fig. 1 is a circuit diagram illustrating a preferred embodiment of the decoder and Fig. 2 is a series of graphs for use in explaining the operation of the system.

Referring to Fig. 1 of the drawing, a radio receiver 11, having a receiving antenna 10, is employed to receive pulse modulated carrier wave signals and to amplify and rectify these pulses and supply them to the input winding of transformer 12. The transformer 12 operates to differentiate the output pulse signals from receiver 11 and supply them to the control grid of vacuum tube 13. The output of tube 13 is coupled to the input of vacuum tube 14. The tube 14 is provided with conventional plate and cathode load impedances, so that its output can be coupled to the input of the triode vacuum tube 17 via the switch 15 and condenser 16 in either of two polarities. A suitable input impedance and operating potential for the grid of tube 17 is provided by means of the resistance network shown, which includes the resistor 25 and potentiometer 18. The position of the potentiometer 18 is normally set to provide a slight positive bias to the grid of tube 17. The output of tube 17 is coupled to the input of tube 19. Tube 19 is provided with a negative grid bias and is organized to operate as a cathode follower circuit by virtue of the inductance 20 and resistance 21 connected in series in the cathode circuit. The cathode output circuit is connected by the network consisting of condenser 22, rectifier 23 and condenser 24 to the output terminals.

Considering now the operation of the system, pulse modulated carrier wave signals are received by antenna 10 and supplied to the input of receiver 11, where they are amplified at radio frequency, rectified, further amplified at video frequency and supplied to the input of transformer 12 as pulse video signals. The secondary winding of transformer 12 operates to differentiate received pulse signals and is of such polarity that differentiated pulse signal produced between the control grid and cathode of tube 13 is comprised of a narrow positive pulse corresponding to the trailing edge. The choice of circuit constants and operating potentials are such that grid current is drawn on the occurrence of the positive pulse and therefore only the narrow negative pulse is reproduced by tube 13. The purpose of the differentiation is to convert received pulses of any width to narrow pulses of uniform width. The output from tube 13 is, accordingly, in the form of narrow positive pulses of uniform amplitude as applied to the grid of tube 14. As indicated in the drawing, the output from the plate circuit of tube 14 consists of pulses of negative polarity and that from the cathode circuit of tube 14 consists of pulses of positive polarity. With switch 15 in the "down" position, as shown, pulses of positive polarity are coupled via condenser 16 to the grid of tube 17.

The decoder proper is the portion of the circuit comprising tubes 17 and 19 and the operation is illustrated by the Fig. 2 graphs. In column A, graph 1, two positive pulses of a paired pulse signal are shown as they would appear for application to the grid of tube 17. The grid of tube 17, as heretofore stated, is at a slightly positive potential relative to its cathode by virtue of the setting of potentiometer 18 and, accordingly, the condenser 16 has a fixed value of charge which is determined by this setting, since it will be clear that some grid current flows in tube 17 in the normal condition of the circuit. When the first positive pulse signal is applied to the grid of 17, more grid current is drawn rapidly to charge condenser 16 to a negative value which is one limit of charge as shown in graph 2 of column A. Thereafter, condenser 16 starts to discharge exponentially as shown in the graph.

The form and magnitude of the exponential discharge curve is determined by the capacity value of condenser 16 and the resistances in series with it (principally resistor 25) which form the time constant circuit and also the limits of charge and discharge. These limits are set by the amount of grid current drawn when the first pulse occurs and the final value of discharge potential set by potentiometer 18.

The occurrence of the second pulse of the pair, which is shown to occur during the exponential discharge period, operates to complete the discharge to the limit set by potentiometer 18 and to accomplish this completion very rapidly. Accordingly, the plate voltage of tube 17 has the form shown in graph 3. This wave, as coupled to the grid of tube 19, is of the form shown in graph 4 where it is shown related to the dotted line representing the grid cut-off bias. This bias is chosen so that only the upper part of graph 4 is effective as a single wide pulse. Normally this wide pulse voltage would be repeated in the same polarity across the cathode output impedance of tube 19 but, as previously stated, this cathode load circuit is comprised of inductance 20 and resistor 21 to operate as a differentiating circuit. Accordingly, the voltage developed across the cathode output of tube 19 is differentiated and has the double pulse form shown in graph 5 of column A. This form consists of an initial positive pulse and a following negative pulse. The rectifier 23 is suitably biased as indicated in the drawing and, accordingly, only a negative output pulse, as shown in graph 6 of column A, is produced. It is evident, therefore, that the application of a pair of positive pulses applied to the grid of tube 17, that is, to the input of the decoder, operates to produce a single negative output pulse for the conditions above described.

The rejection by the decoder circuit of a single negative pulse signal applied to the grid of tube 17 is illustrated in column B, where it is shown (graph 1) that a single positive input pulse signal causes grid current to be drawn in tube 17 and so produces an output wave of the form shown by graph 2. Condenser 16, as the wave form shows, is rapidly charged and then, in the absence of a second received pulse, continues a complete exponential discharge. The remaining graphs 3, 4, 5, and 6 of column B illustrate that when this exponential discharge is not interrupted and rapidly completed by the reception of a second pulse, then the differentiation in the cathode circuit of tube 19 produces only a single positive pulse and no negative pulse and, accordingly, there is no output from the decoder.

Comparing now columns A and B of Fig. 2, it is evident that, with the setting of potentiometer 18 for the conditions of operation thus far described, if the second pulse of the pair occurred after the exponential discharge were completed its effect would be to once more cause grid current to be drawn in tube 17 and would not accomplish any rapid completion of condenser discharge such as would produce an output pulse from the decoder. Thus, for a given setting of potentiometer 18, pulses of a pair which are time spaced too wide will produce no response. Similarly, if the second pulse of a pair occurs too quickly following the first pulse, as for example when the condenser 16 is still being charged, then again there can be no operation to produce an output signal from the decoder. Accordingly, the setting of potentiometer 18 will determine a condition of operation for response to time space pulses when the second pulse of the pair occurs at a suitable time after the first pulse.

In dotted line the response of the decoder is indicated for more widely spaced pulses in graphs 1 and 2 of column A and it will be evident from the description thus far given that this response to wider spaced pulses may be accomplished by changing one of the limits of charge by suitable adjustment of potentiometer 18.

Accordingly, it will be clear that the decoder is one having fairly wide tolerances to the spacing of the pulses and constitutes an arrangement which readily may be adjusted to respond to different spacings. Also, it will be clear that, with switch 15 in the "down" position as shown in the drawing, the circuit will not respond to a single pulse but will respond only to paired pulses having a particular time spacing. It will also be evident that the use of the decoder for very widely spaced pulses is not desirable, since noise or an interfering pulse occurring in the space interval would interfere with the operation. In practice, paired pulse signals having a time spacing of a few microseconds have been efficiently employed with the described decoder circuit.

For some types of operation it is desirable to have the decoder respond to single pulse signals. In the arrangement of the present invention this is accomplished by simply throwing switch 15 to the "up" position, whereby received pulses are applied to the grid of tube 17 in negative polarity. The operation is illustrated by the graphs 1–6 of column C, Fig. 2. It will be evident from these graphs that when negative pulses are so applied there is no additional grid current drawn in tube 17, rapidly to charge the condenser 16, but instead there is merely a repeating of the applied pulse which, when differentiated by circuit elements 20 and 21, results in a negative pulse output. Accordingly, the decoder will respond to single pulse signals with switch 15 in the "up" position and will respond to paired pulse signals of a particular time spacing when the switch is in the "down" position.

While there has been described what is at present considered to be the preferred embodiment of this invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. A decoder for paired pulse signals, which is adjustable to respond to pulses of a pair having substantially a particular time spacing, comprising a condenser and resistance time constant circuit and a source of operating voltage, means utilizing said source to provide limits of charge and discharge for said condenser and means to adjust at least one said limit, means responsive to a first received pulse signal for rapidly charging said condenser to one limit, means comprising said resistor for exponentially discharging said condenser to the other limit, to provide a condition of operation such that the occurrence of a second received pulse signal during a limited time interval following said charging rapidly completes said discharging, and means responsive to the rapid discharging for producing an output signal.

2. A decoder for paired pulse signals which is adjustable to respond to pulses of a pair having substantially a particular time spacing comprising a condenser and resistance time constant circuit and a source of operating voltage, means utilizing said source to provide limits of charge and discharge for said condenser and means to adjust at least one said limit, means responsive to a first received pulse signal for rapidly charging said condenser to one limit, means comprising said resistor for exponentially discharging said condenser to the other limit, to provide a condition of operation such that the occurrence of a second received pulse signal during the time that said discharge approaches said other limit rapidly completes said discharging, and means responsive to the rapid completion of said discharging for producing an output signal.

3. A decoder for paired pulse signals which is adjustable to respond to pulses of a pair having substantially a particular time spacing comprising a condenser and resistance time constant circuit and a source of operating voltage, means utilizing said source to provide limits of charge and discharge for said condenser and means to adjust at least one said limit, means responsive to a first received pulse signal for rapidly charging said condenser to one limit, means comprising said resistor for exponentially discharging said condenser to the other limit, to provide a condition of operation such that the occurrence of a second received pulse signal during a limited time interval following said discharging rapidly completes said discharging and means comprising a differentiating circuit responsive to the rapid discharging for producing an output pulse signal.

4. A decoder for paired pulse signals which is adjustable to respond to pulses of a pair having substantially a particular time spacing comprising a condenser and resistance time constant circuit and a source of operating voltage, means utilizing said source to provide limits of charge and discharge for said condenser and means to adjust at least one said limit, means responsive to a first received pulse signal for rapidly charging said condenser to one limit, means comprising said resister for exponentially discharging said condenser to the other limit, to provide a condition of operation such that the occurrence of a second received pulse signal during a limited time interval following said discharging rapidly completes said discharging, limiting means for converting said discharging to a pulse wave having steep leading and trailing edges and means responsive to said trailing edge for producing an output pulse signal.

5. A decoder for paired pulse signals which is adjustable to respond to pulses of a pair having substantially a particular time spacing comprising a condenser and resistance time constant circuit and a source of operating voltage, means utilizing said source to provide limits of charge and discharge for said condenser, a vacuum tube having anode, cathode and grid control elements, means comprising the grid-cathode path of said tube for rapidly charging said condenser to one limit, means comprising said resistor for exponentially discharging said condenser to the other limit to provide a condition of operation such that the occurrence of a second received pulse signal during a limited time interval following said discharging rapidly completes said discharging, means responsive to the rapid discharging for producing an output signal and means to adjust said other limit to cause response for a different time spacing.

6. A decoder for pulse signals having one mode of operation in which it is adjustable to respond only to pulses of a pair having substantially a particular time spacing comprising a condenser and resistance time constant circuit and a source of operating voltage, means utilizing said source to provide limits of charge and discharge for said condenser and means to adjust at least one said limit, means for applying received pulse signals in one polarity to said decoder, means responsive to a first received pulse signal for rapidly charging said condenser to one limit, means comprising said resistor for exponentially discharging said condenser to the other limit, to provide a condition of operation such that the occurrence of a second received pulse signal during a limited time interval following said charging rapidly completes said discharging and means responsive to the rapid discharging for producing an output signal and means for providing a second mode of operation responsive to single pulse signals comprising means for applying received pulse signals in the opposite polarity to said decoder.

BERT H. SINCLAIR.

References Cited in the file of this patent

UNITED STATES PATENTS

| Number | Name | Date |
|---|---|---|
| 2,275,930 | Torcheux | Mar. 10, 1942 |
| 2,399,668 | Francis | May 7, 1946 |
| 2,484,352 | Miller | Oct. 11, 1949 |